April 8, 1969   C. J. MANN   3,437,342
CHUCK CONSTRUCTION
Filed Aug. 23, 1965

INVENTOR.
CHARLES J. MANN
BY

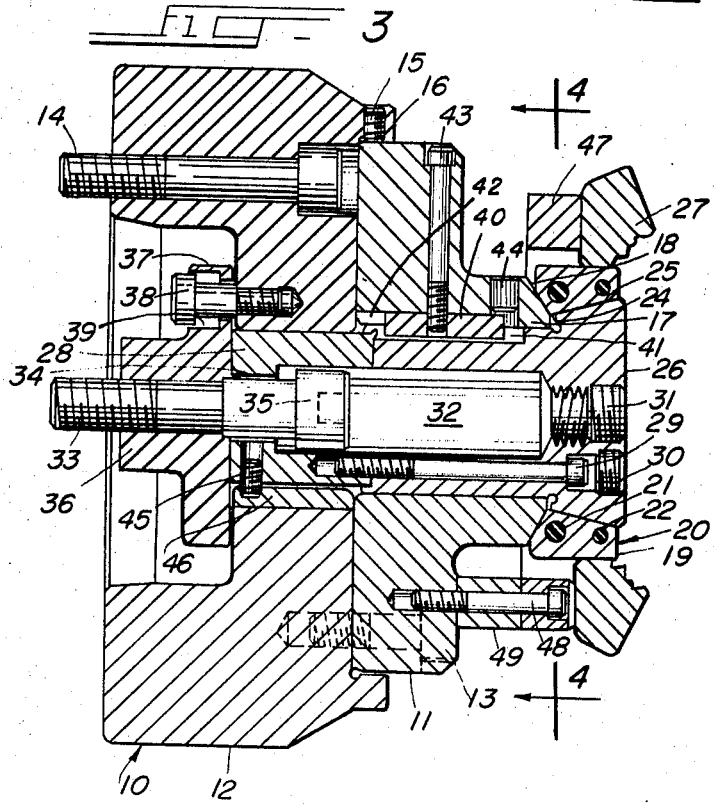
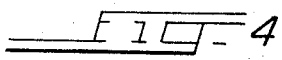
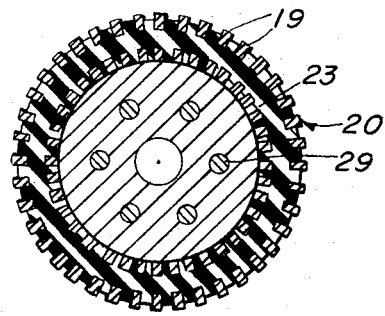

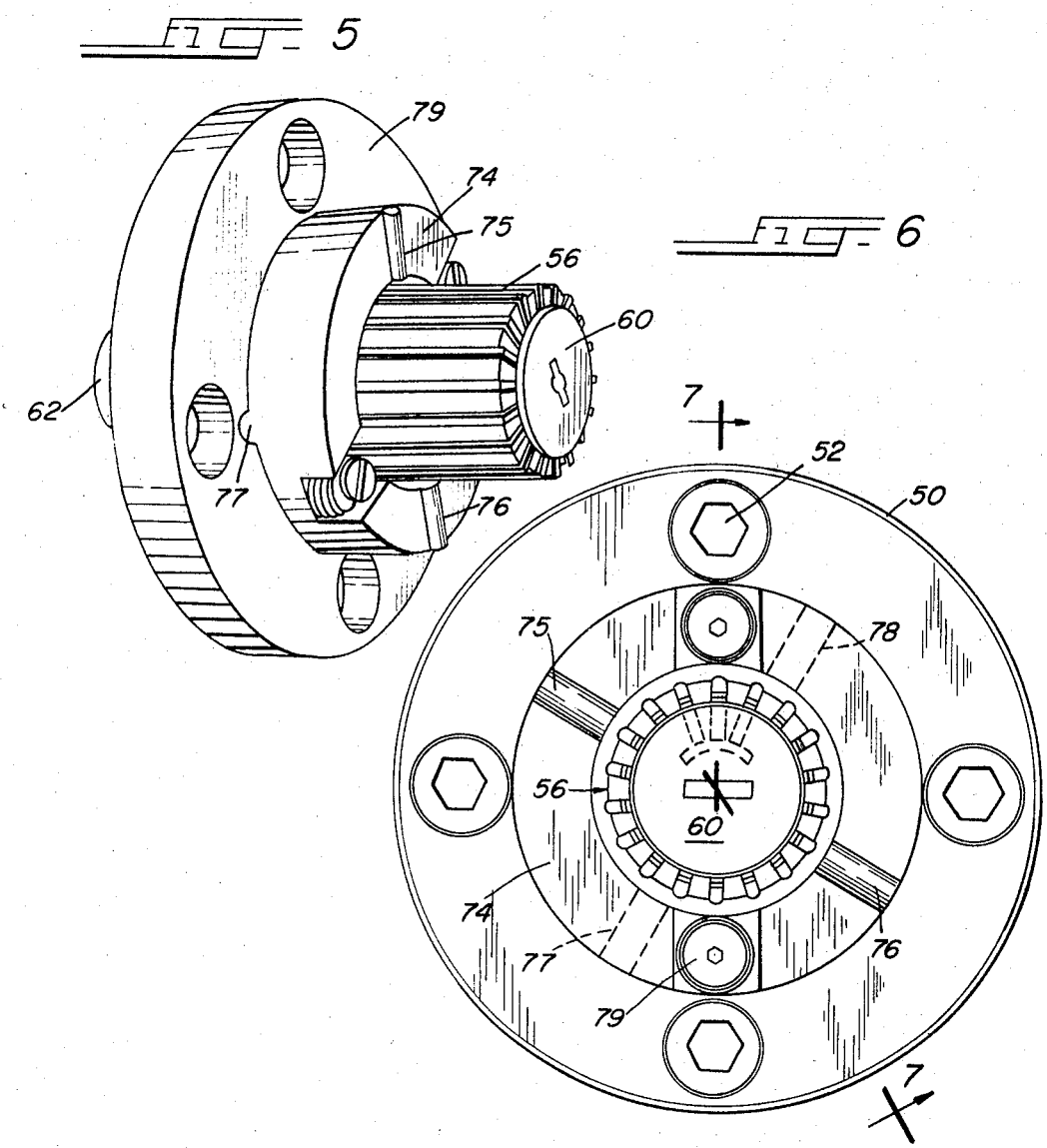

United States Patent Office 3,437,342
Patented Apr. 8, 1969

3,437,342
CHUCK CONSTRUCTION
Charles J. Mann, 1048 Peninsula Drive,
Traverse City, Mich. 49684
Filed Aug. 23, 1965, Ser. No. 481,459
Int. Cl. B23b *31/40, 5/22, 5/34*
U.S. Cl. 279—2                                               2 Claims

ABSTRACT OF THE DISCLOSURE

A chuck having a radially yieldable clamping ring controlled by relative axial movement between thrust and conical surfaces, and also having a stop ring shiftable about a transverse axis and providing opposite abutment points on a diameter 90° displaced from said transverse axis about the axis of rotation of said chuck.

---

This invention relates to the construction of chucks, these being devices normally mounted on rotative machine spindles to hold work pieces for machine operations. The preferred form of the invention has been developed for engaging inside diameters, and functions to bring the work pieces into alignment as the engaging expansion of a chuck proceeds. This preferred form utilizes a particular type of expansion member, which is essentially an annular group of plates secured together with rubber-like material to form a peripherally expandable ring having a particularly large range of expansion compared to the usual steel collet construction. This very range is utilized by the present invention to facilitate the axial positioning of the work piece, and its alignment with respect to a plane perpendicular to the axis of rotation. In one modification of the invention, the stop structure used for positioning the work piece is capable of resilient articulation with respect to such a plane to accommodate local roughness or irregularities in the surface of the work piece such as is commonly encountered in castings.

The several features of the invention will be analyzed in detail through discussion of the particular embodiments illustrated in the accompanying drawings. In the drawings:

FIGURE 3 is an axial section of the chuck shown in FIGURE 1, with a work piece in position.

FIGURE 4 is a section of a plane 4—4 of FIGURE 3, showing the expanding device only.

FIGURE 5 is a perspective view of a modified form of a chuck.

FIGURE 6 is a front view of the chuck shown in FIGURE 5.

Figure 1:
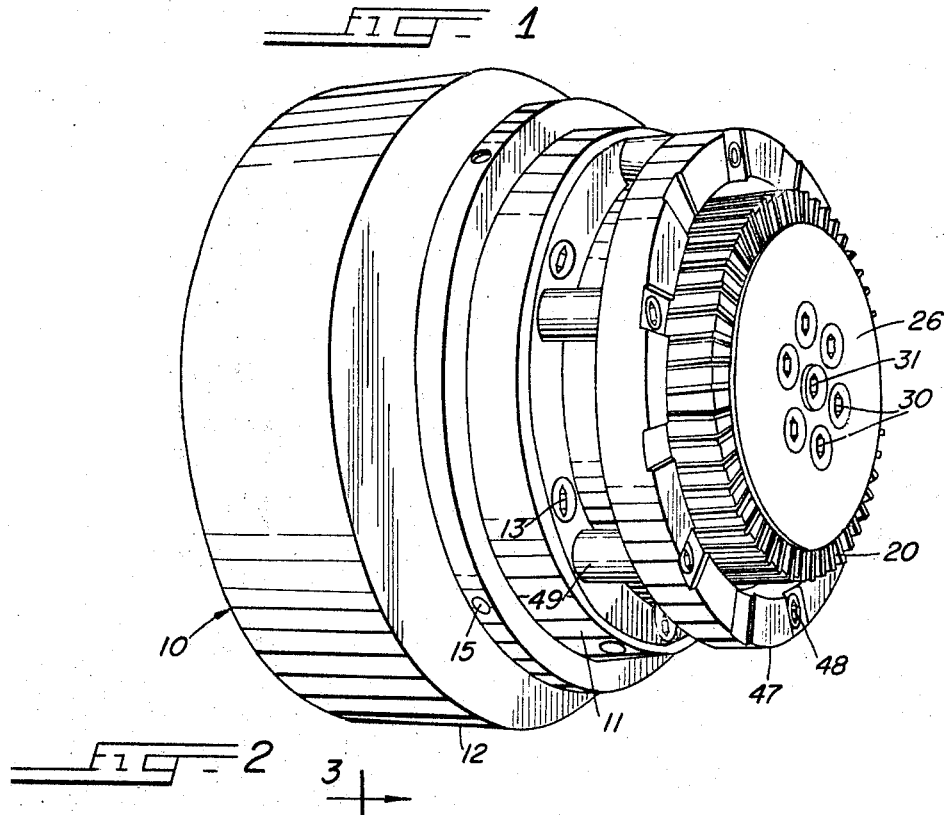
FIGURE 1 is a perspective view of one modification of the chuck, without a work piece in position.
Figure 2:
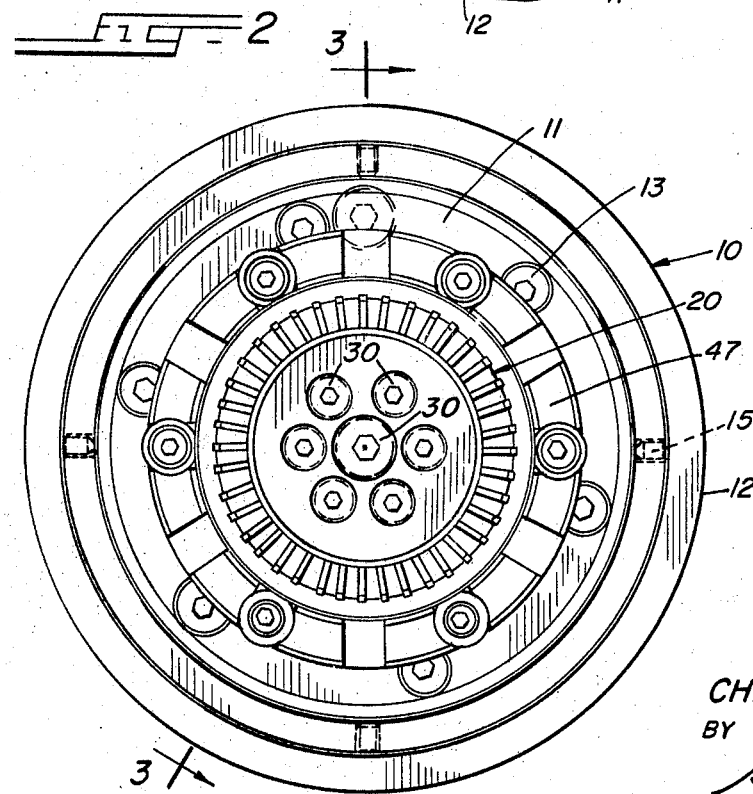
FIGURE 2 is a front view of the chuck construction shown in FIGURE 1.
Figure 7:
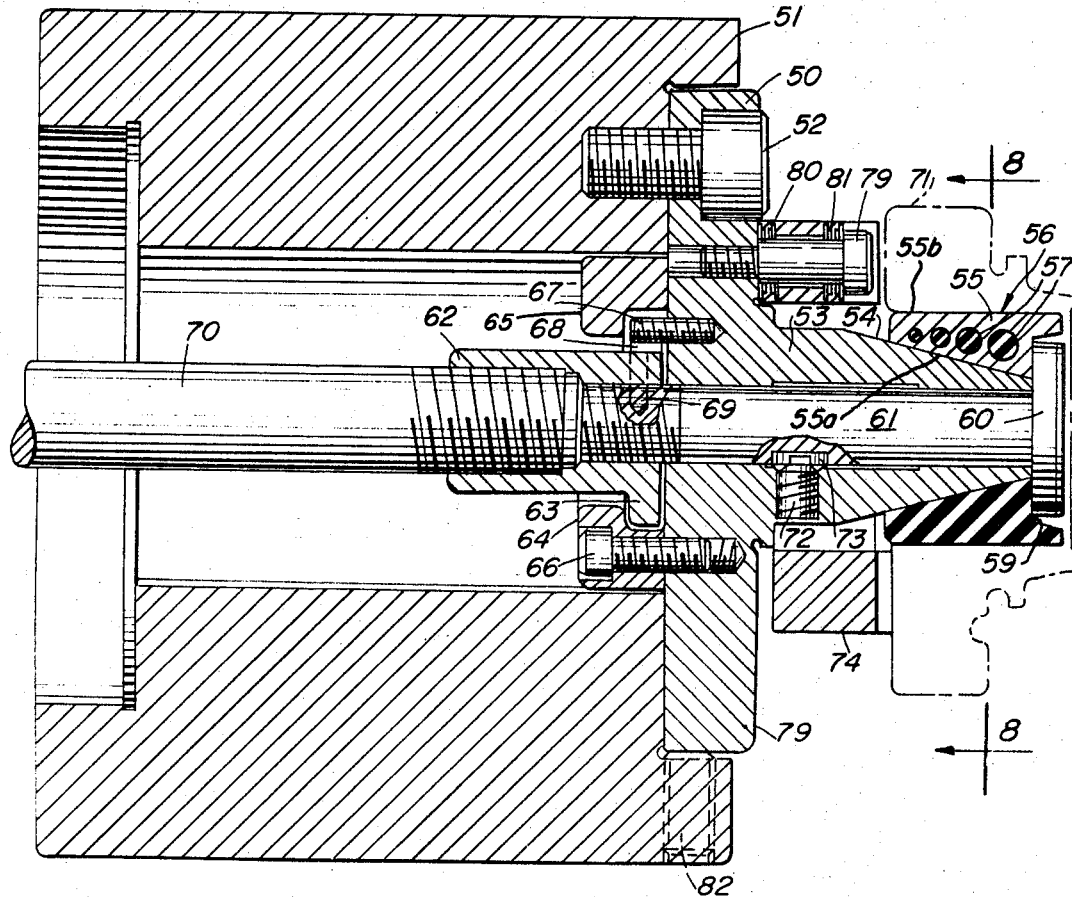
FIGURE 7 is an axial section showing the chuck illustrated in FIGURE 5 mounted on an adapter.
Figure 8:
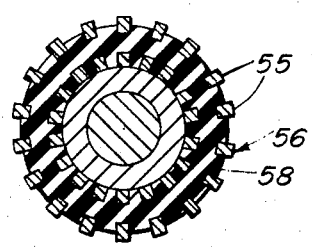

FIGURE 8 is a section on the plane 8—8 of FIGURE 7. The chuck construction shown in FIGURES 1–4 includes a body generally indicated at 10 formed by the front portion 11 and the rear portion 12 which are separable, and are normally interconnected by the bolts 13. The rear portion 12 is normally secured to the spindle of a lathe by bolts as shown as at 14. The coaxial alignment of the front portion 11 with respect to the axis of rotation of the machine may be initially established by the manipulation of screws 15 disposed at convenient peripherally-spaced positions around the ridge 16 of the rear body portion 12. When location has been properly determined, the tightening of the screws 13 will maintain the adjusted position.

The front body portion 11 has a projection 17 having a peripheral thrust surface 18 tapering axially outwardly with respect to the body of the chuck to a reduced diameter. This thrust surface is normally in engagement with the rear edges of the plates 19 of the radially yieldable clamping ring unit 20. These plates are perforated as shown at 21 and 22, and are secured together by a mass of rubber-like material 23 which occupies the space between the plates 19, and is continuous through the perforations 21 and 22. Preferably, the entire ring unit 20 is molded in such a manner that the mass of rubber is bonded to the plates 19.

The edge 24 of the plates 19 may be regarded as the actuating edge, and these edges are supported by the conical surface 25 of the actuating assembly component 26. Movement to the left of this component, as shown in FIGURE 3, will produce an interaction between the surfaces 18 and 25 to produce both a radially outward movement of the plates 19, and a small degree of axial movement of these plates to the left. The radial outward movement results in a peripheral expansion of the ring 20, and a clamping action against the inside diameter of the work piece 27. This work piece happens to be a blank for a ring gear, which is held in position for machining operations.

The actuating assembly responsible for the movement of the component 26 includes the cup-shaped member 28 secured to the member 26 by bolts as shown at 29. The heads of the bolts 29 are concealed by the access screws 30, and a similar screw 31 provides access to the interior space 32 within the component 26. A tool may be inserted through the opening covered by the screw 31 to manipulate the bolt 33, which is normally interconnected with the actuating rod (not shown) of the machine on which the device is moutned. The bolt 33 traverses the opening 34 in the base of the member 28, and this opening is somewhat smaller than the head 35 of the bolt so that tension applied to the bolt to the left, as shown in FIGURE 3 will result in applying a pulling action transferred ultimately to the component 26. A limitation to this axial movement to the left if provided by the presence of the member 36 secured at its flange 37 to the rear of the body portion 12 by a series of bolts 38. The flange 37 is counterbored at 39 to receive the heads of the bolts 38, which provides a limited degree of lost motion representing the reciprocating movement of the actuating assembly for inducing the expansion and contraction of the ring 20. The member 26 is held in non-rotative relationship with respect to the outer body portion 11 by a key 40 engaging the key ways 41 (in the member 26) and 42 (in the front body portion 11). The key preferably is held in position by a bolt as shown at 43 in FIGURE 3. A screw 44 conceals an access opening which may be used for maniplatiing the key 40, and also for chip clearance during the machining of the key way 42. The cup member 28 is maintained in non-rotative relationship with the rear body portion 12 by the engagement of the pin 45 with the key way 46.

The alignment of the work pieces 27 with respect to a plane perpendicular to the axis of rotation of the chuck assembly is facilitated by the presence of the abutment ring 47 secured to the front body portion 11 by bolts 48 traversing the spacer tubes 49. The axial movement of the ring unit 20 as the expansion proceeds will tend to carry the work piece 27 along with it, with the resulting engagement with the ring 47 producing a tendency to properly align the rear face of the work piece 27 against the ring 47.

The chuck construction shown in FIGURES 5–8 includes a body 50 secured to the adapter 51 by the bolts 52. The adapter, in turn, is normally secured to a spindle (not shown) of a lathe. The body 50 has a projection 53 having a peripheral conical surface 54 tapering axially outward to reduced diameter, and supporting the radially actuating edge surfaces 55a of the plates 55 of the radially yieldable clamping ring unit 56. These plates having peripheral edge surfaces 55b, and are preforated as shown as 57. Rubber material 58 is present in the spaces between the plates, and traverses the perforations. The plates 55 have the edges 59 normally in engagement with the thrust surface formed by the head 60 of the special bolt 61, which has the left end engaging the coupling 62. This coupling has a flange 63 confined by the flange 64 of the cap 65, with limited freedom of axial movement. This cap is secured to the body 50 by the bolts 66. The coupling 62 is maintained in non-rotative engagement with respect to the body 50 by the presence by the pin 67 engaging the slot 68 of the flange 63, and pressed into a suitable hole in the body 50. The bolt 61 is held in non-rotative engagement with the coupling 62, after assembly therewith, by the pin 69. The attachment of the coupling 62 to the drawbar associated with the machine (not shown) on which the device is mounted completes the actuating assembly which induces the expansion of the ring 56 to engage the inside diameter of the work piece shown in dotted lines at 71. The bolt 61 may also be held in engagement with the body 50 by a set screw as shown at 72 engaging a recess 73 in the bolt.

The chuck construction shown in FIGURES 5–8 is provided with a resilient stop structure in which stop ring 74 is mounted for articulation with respect to a plane perpendicular to the axis of rotation of the chuck. Referring particularly to FIGURE 5, the ring 74 is provided with the diametrically-opposite convex abutment points 75 and 76 on the outer face for engagement with work pieces shown at 71 in FIGURE 7. The work pieces are engaged in what amounts to line contact. An inner pair of diametrically-opposite abutment points 77 and 78 engage the face 79 of the body 50 in a line contact which is preferably in an axial plane approximately 90 degrees displaced from the axial plane of contact of the abutments 75 and 76. The abutment ring 74 is thus capable of functioning somewhat in a manner of a universal joint, with freedom to articulate about perpendicular axes transverse to the axis of rotation of the chuck to accommodate small surface irregularities in the work piece 71. The ring 74 is preferably held resiliently in engagement with the body 50 by the presence of the bolts 79 and the springs 80 and 81. The bolts and springs provide a limited degree of resilient freedom of movement of the abutment ring 74 establishing an approximate normal position, with the ring capable of being deflected slightly from this position as the expansion of the ring unit 56 proceeds, accompanied by the movement of the work piece to the left into engagement with the ring 74. This movement involves a sliding of the plates 55 to the left (rearwardly or inwardly) along the surface 54. The alignment of the entire assembly with respect to the axis of rotation of the machine may be adjusted by manipulation of a group of screws as shown at 82, with the final adjustment being secured by tightening of the bolts 52.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:
1. A normally rotative chuck construction having a body portion and a radially yieldable clamping ring controlled by relative axial movement between members providing thrust and conical surfaces, wherein the improvement comprises a stop ring mounted on said body portion for limited rotation on an axis transverse to the axis of rotation of said chuck, and having abutment stops disposed on a diameter ninety degrees displaced from said transverse axis about said axis of rotation.

2. A chuck construction according to claim 1, wherein said chuck includes resilient means securing said ring to said body portion.

References Cited

UNITED STATES PATENTS

| 2,469,873 | 5/1949 | Ernest | 279—2 |
| 2,732,213 | 1/1956 | Drew | 279—2 |
| 2,877,022 | 3/1959 | Parker | 279—2 |
| 2,896,954 | 7/1959 | Ernest | 279—2 |
| 2,985,456 | 5/1961 | Stoner | 279—51 |

FOREIGN PATENTS 186,947  9/1956  Austria.

ROBERT C. RIORDON, *Primary Examiner.*

J. C. PETERS, *Assistant Examiner.*